C. E. WILLIAMS.
VEHICLE TIRE.
APPLICATION FILED MAR. 8, 1918.
1,277,516. Patented Sept. 3, 1918.
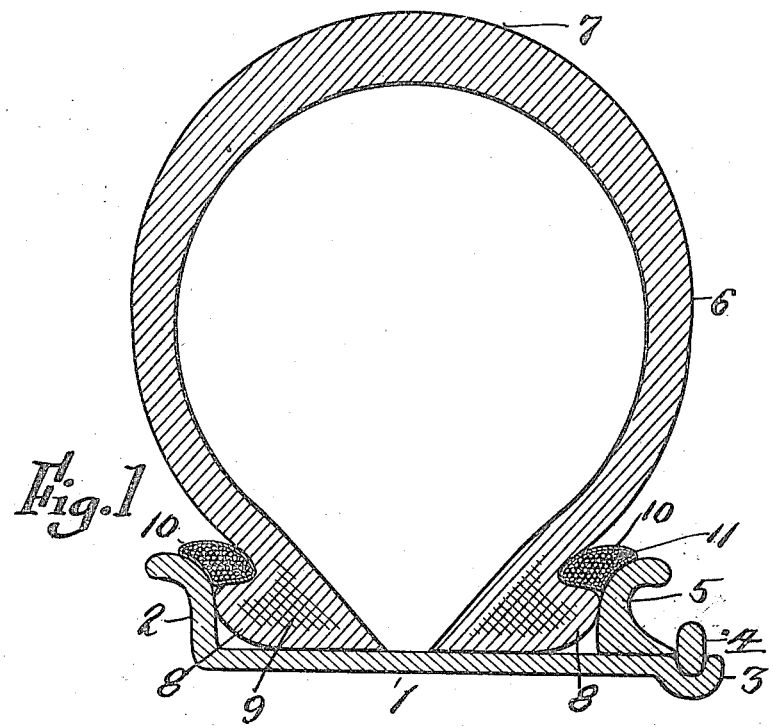
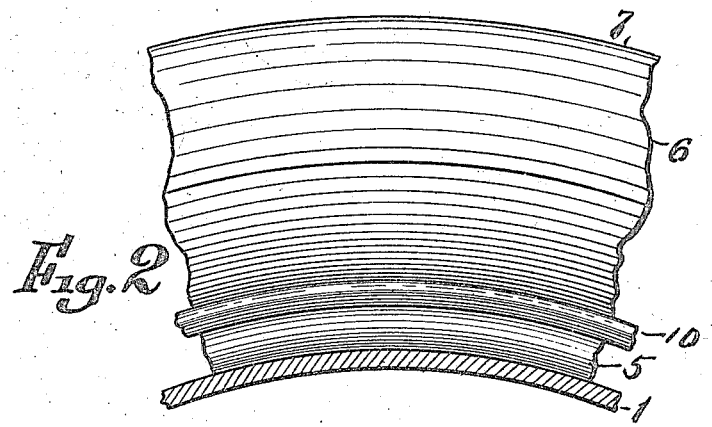
Witness
Inventor
Charles E. Williams,
By C. E. Humphrey
Attorney

UNITED STATES PATENT OFFICE.

CHARLES E. WILLIAMS, OF AKRON, OHIO.

VEHICLE-TIRE.

1,277,516.  Specification of Letters Patent.  Patented Sept. 3, 1918.

Application filed March 8, 1918. Serial No. 221,188.

*To all whom it may concern:*

Be it known that I, CHARLES E. WILLIAMS, a citizen of the United States, residing at Akron, in the county of Summit and State of Ohio, have invented new and useful Improvements in Vehicle-Tires, of which the following is a specification.

This invention relates to improvements in elastic tires for vehicles and the object of the invention is to provide means whereby an ordinary conventionally formed clencher tire may be seated on the outer face of a rim normally adapted and designed for the reception of what are known as straight side tires of the Dunlop type. The invention provides means for effectually retaining a clencher tire on this type of rim and affords means whereby a vehicle wheel provided with a rim having flanges adapted for use in connection with Dunlop tires may be equipped effectively with tires of the clencher type.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, but it is to be understood that changes, variations and modifications can be resorted to which come within the scope of the matter hereinafter claimed.

In the drawings in which similar reference numerals indicate like parts in the different figures, Figure 1 is a transverse sectional view of the rim portion of a vehicle wheel equipped with a rim of the straight side type and having a clencher tire mounted thereon, said tire provided with my improved holding means, and Fig. 2 is a view partly in side elevation and partly in section of a portion of the device shown in Fig. 1.

Referring to the drawings in detail reference numeral 1 denotes a vehicle wheel rim, the outer face of which constitutes a seat for a tire, and this rim is provided along one edge with an outwardly-extending annular flange 2 and along the opposite side with an offset 3 provided with a channel in which is mounted a split locking ring 4 which serves as a means of locking an annular endless tire retaining ring 5 which is mounted on said rim against outward lateral movement. The rim just described is of an ordinary type and is such a rim as is commonly employed for holding what are known as straight side tires provided with inextensible beads or edges.

Mounted on the outer face of the rim 1 is a clencher tire 6 provided with a tread 7 and with hook-shaped beads 8 and in which are reinforcing or inextensible portions 9 of ordinary construction. In ordinary practice the tire 6 is inflated and held in position by an inner inflatable air tube in the usual manner but as this tube forms no part of this invention it is omitted from the drawings. Experience has shown that when a tire having stretchable beads is inflated on a rim adapted for use in connection with straight side tires the beads will stretch sufficiently to permit their lateral passage or movement over the side flanges of the rim and thereby render the use of this type of tire on a straight side rim impossible. In order to secure a stretchable clencher tire on a rim designed for receiving straight side tires I employ two endless inextensible bands 10 which are preferably so fashioned as to conform to the outer portions of the beads 8 of the clencher tire 6, and prevent the outward movement of these beads when the tire is inflated. I have found that retaining bands for this purpose which are composed of a plurality of wires 11 embedded and vulcanized in a body of rubber beads best subserve the purpose for which they are intended and if fashioned to partly seat against the tire retaining flanges 2 and 5 of the rim and also upon the outer portions of the beads 8 the object is accomplished very efficiently. It is obvious, of course, that in place of retaining rings constructed of a plurality of wires 11 a single band of metal or other inextensible material may be used and hence I do not confine myself to the peculiar construction of the retaining bands shown and described.

I claim,

In combination a vehicle wheel rim provided along the side edges thereof with annular outwardly-extending flanges adapted for coöperation with the beads of a straight side tire of the Dunlop type, a clencher tire having stretchable beads mounted thereon, and a pair of endless inextensible bands seated partially on the outer lateral faces of the beads of said tire and the outer faces of said flanges.

In testimony whereof I have hereunto set my hand.

CHARLES E. WILLIAMS.